United States Patent
Leonard

(10) Patent No.: US 7,483,386 B2
(45) Date of Patent: Jan. 27, 2009

(54) ADAPTIVE THRESHOLD SETTING FOR DISCONTINUOUS TRANSMISSION DETECTION

(75) Inventor: Eric David Leonard, Morris Township, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 552 days.

(21) Appl. No.: 11/096,201

(22) Filed: Mar. 31, 2005

(65) Prior Publication Data

US 2006/0221707 A1    Oct. 5, 2006

(51) Int. Cl.
     *H04J 1/16*      (2006.01)
(52) U.S. Cl. .................... 370/252; 375/148; 714/100
(58) Field of Classification Search ............. 370/252, 370/332, 333, 394, 470
See application file for complete search history.

(56) References Cited

U.S. PATENT DOCUMENTS

| | | | |
|---|---|---|---|
| 6,400,960 B1 | 6/2002 | Dominique et al. | |
| 6,501,788 B1 | 12/2002 | Wang et al. | |
| 6,504,827 B1 | 1/2003 | Kuo et al. | |
| 6,856,644 B1 | 2/2005 | Wang et al. | |
| 6,859,456 B1* | 2/2005 | Hetherington et al. | 370/394 |
| 2003/0074197 A1* | 4/2003 | Chen | 704/262 |
| 2003/0142632 A1* | 7/2003 | Lin et al. | 370/252 |
| 2004/0095918 A1 | 5/2004 | Domonique et al. | |
| 2004/0165560 A1 | 8/2004 | Harris et al. | |
| 2004/0203463 A1 | 10/2004 | Chen et al. | |
| 2004/0240529 A1* | 12/2004 | Leonard et al. | 375/148 |
| 2005/0220058 A1* | 10/2005 | Garg | 370/335 |
| 2006/0281485 A1* | 12/2006 | Johnson et al. | 455/552.1 |
| 2007/0282603 A1* | 12/2007 | Bessette | 704/219 |

OTHER PUBLICATIONS

Adaptive Voice Activity Detection for Wireless Communications Based on Hybrid Fuzzy Learning, By: F. Beritelli, S. Casale, A. Cavallaro, XP-000805198; pp. 1729-1734.
PCT International Search Report for Application No. PCT/US2006/009395, mailed Jul. 28, 2006.
Written Opinion of the International Searching Authority for Application No. PCT/US2006/009395, mailed Jul. 28, 2006.

* cited by examiner

*Primary Examiner*—Huy D Vu
*Assistant Examiner*—Abdullah Riyami

(57) ABSTRACT

A method of adaptively determining a threshold for determining whether an error associated with a frame is an erasure or the result of a discontinuous transmission (DTX) uses a sample set of recently received frames yet avoids undesirable influences on the threshold that otherwise might be caused by the number of erasures in the sample set. A disclosed example uses a histogram-based approach and a simulated sort through the histogram to determine an appropriate threshold value. In a disclosed example the lesser of a bad frame threshold guideline value and a good frame threshold guideline value provide the threshold used to distinguish between a DTX and an erasure.

9 Claims, 2 Drawing Sheets

ADAPTIVE THRESHOLD SETTING FOR DISCONTINUOUS TRANSMISSION DETECTION

FIELD OF THE INVENTION

This invention generally relates to telecommunications. More particularly, this invention relates to wireless communication systems.

DESCRIPTION OF THE RELATED ART

Communication systems, such as wireless systems are designed to meet various demands of subscribers. Service providers continuously seek ways to improve the overall performance of the communication system. As wireless communications become more and more popular for subscribers to obtain data (e.g., e-mail or information from the internet), communication systems should be capable of a higher throughput and be tightly controlled to maintain a high quality of service. Communication is conducted according to any desired communications standard, such as the Universal Mobile Telecommunications Standard (UMTS) or a Code Division Multiple Access (CDMA) standard.

Wireless communication systems typically include a plurality of base stations that are positioned to serve particular geographic regions or cells. A scheduler at the base station selects a user for transmission at a given time, and adaptive modulation and coding allows selection of an appropriate transport format (modulation and coding) for the current channel conditions seen by the user. There are two directions of signal flow in such systems. The base station transmits to a mobile station on a downlink. The mobile station transmits to the base station on an uplink.

A base station uses a known technique for determining whether communications in the uplink direction are working satisfactorily. A checksum value, which typically is included at the end of a transmitted frame, provides an indication of whether uplink transmissions are being received successfully.

If the received checksum does not match an expected value, this results in a checksum error. Because the base station has no indication of whether an uplink transmission occurred during a particular frame, the base station has no way of discerning between the possible causes of a checksum error. One possible cause of a checksum error is a transmitted frame that became garbled during transmission because of poor channel conditions. In other words, the mobile device tried to transmit a frame but the frame was not received correctly by the base station. This cause is called an "erasure."

Another possible cause of a checksum error is when the mobile device chose not to send a frame at all. This cause is called a "discontinuous transmission" (DTX). This may occur if, for example, the mobile device did not have any data to send to the base station for a particular frame or set of frames. Some communications standards allow for mobile stations to independently decide, on a frame-by-frame basis, whether to send a data packet within a frame. At times, such as during transmitting supplemental channels or digital control channels, the mobile station will not send anything within one or more frames. The mobile device typically does not notify the base station whether it has sent symbols making up a particular frame. Instead, the base station decodes each frame assuming that the mobile device is continuously sending frames. Therefore, when the mobile station intentionally does not send any data during a frame (e.g., there is a DTX on the uplink), the base station typically should detect a checksum error.

Checksum errors are useful for controlling power transmissions, for example. If an erasure occurs, the base station typically notifies the mobile station to increase power during subsequent transmissions to avoid further erasures. If the checksum error resulted from an erasure, the increase in power on the uplink will usually prove useful to avoid subsequent erasures assuming channel conditions are otherwise favorable. If the checksum error occurred because of a DTX on the other hand, increasing power at the mobile station may be detrimental. Unnecessarily increasing power on the uplink introduces possible interference, for example. Additionally, a series of DTX's may result in repeatedly attempting to increase power on the uplink that will exceed limits imposed by the system configuration. Therefore, it is necessary to be able to determine whether an erasure occurred or there was a DTX to determine whether corrective action, such as adjusting the transmission power on the uplink is necessary.

Various proposals have been made regarding DTX detection. One known DTX detection algorithm is based on symbol error rates. This approach is used for convolutional codes and involves re-encoding estimated data bits generated by the convolutional decoder to generate estimated symbols and then comparing the estimated data symbols with the actual received symbols to compute the number of symbol errors. If there are many errors, the base station assumes that the mobile device did not send any symbols (e.g., a DTX case). If there are fewer errors, the base station assumes that the mobile device did send symbols and that the base station failed to decode them correctly back into the original data bits (e.g., an erasure).

Histograms of the respective symbol error rates of DTX cases and erasure cases provide a guide as to the threshold at which DTX cases can be distinguished from erasure cases. Ideally, these histograms are clearly separated, with symbol error rates above the threshold corresponding to a DTX case and symbol error rates below the threshold corresponding to the erasure case. However, there is usually some overlap where a given symbol error rate does not clearly indicate an erasure case or a DTX case. This overlap makes it possible to mistakenly identify a DTX case as an erasure or vice versa. This is one example situation where choosing a threshold for distinguishing between DTX's and erasures is important. Moreover, as channel conditions change or a mobile station transmits more discontinuously than previously, the threshold between the histogram distribution of erasures and DTX's needs to change or the results become skewed.

Another DTX detection approach measures the pilot energy and classifies a checksum error as being caused by an erasure if channel conditions are poor as indicated by a low measured pilot energy. The logic behind this approach is that erasures tend to occur during these conditions. However, pilot energies can be low during DTX's also, which creates a high probability of misclassifying a DTX case as an erasure.

Yet another DTX detection approach sums the absolute values of the symbols in the transmitted frame and compares this sum with a threshold value. Because no symbols are transmitted during a DTX case, the sum would theoretically indicate an erasure case if it exceeds a given threshold. However, the sum is sensitive to channel conditions, causing a large overlap between values corresponding t DTX cases and erasure cases.

The performance of a DTX algorithm is measured by the probability that the algorithm will misclassify an erasure as a DTX (referred to as P(D/E) or missed detection) and the probability that it will misclassify a DTX as an erasure (referred to as P(E/D) or false detection). Therefore, it is important to use reliable criteria for distinguishing between them.

Regardless of the detection technique, there should be a reliable technique for setting a threshold to distinguish between DTX's and erasures.

The nature of the links used in wireless communication systems and the distribution of DTX's and erasures within a given time period do not allow for simple threshold setting. For example, channel conditions can vary widely over time within a cell and even more from cell to cell. Another significant factor affecting the ability to determine a useful metric for determining whether an error corresponds to a DTX is a speed with which a mobile station moves. Different mobile station speeds ideally require different thresholds for distinguishing between erasures and DTX's. It is not possible to set a one-time threshold, for example, that will provide reliable results for an entire network or even a base station for an extended time. Simple averaging or filtering techniques, which would allow changing a threshold over time, do not provide useful results, for example, because such techniques are too sensitive to the number of actual erasures within a sampling of frames that are averaged or filtered.

SUMMARY OF THE INVENTION

This invention addresses the need for establishing reliable thresholds for distinguishing between erasures and DTX's.

This invention provides an adaptively set threshold for distinguishing between a DTX and an erasure. The threshold setting technique of the disclosed example utilizes information regarding recently received frames so that it is adaptive to actual conditions but is relatively immune to the number of erasures within the recently received frames such that the threshold is not undesirably skewed in a manner that otherwise would interfere with accurately distinguishing a DTX from an erasure.

An exemplary disclosed method of communicating includes adaptively determining a threshold for distinguishing between a DTX and an erasure based on at least one determined guideline value from a histogram of a sample set of recently received frames.

One example includes determining a good frame threshold guideline value and a bad frame threshold guideline value. Each guideline value in this example is based on a histogram of the respective type of frames within the sample set. One example method includes selecting the lesser of the good frame threshold guideline value or the bad frame threshold guideline value and using that as the threshold for distinguishing a DTX from an erasure.

A disclosed example includes arranging the sample set into a plurality of bins that facilitate simulating a sort of the sample set to estimate a median value of the histogram, which provides an indication of the threshold.

The various features and advantages of this invention will become apparent to those skilled in the art from the following detailed description. The drawing that accompanies the detailed description can be briefly described as follows.

DETAILED DESCRIPTION

Figure 1:
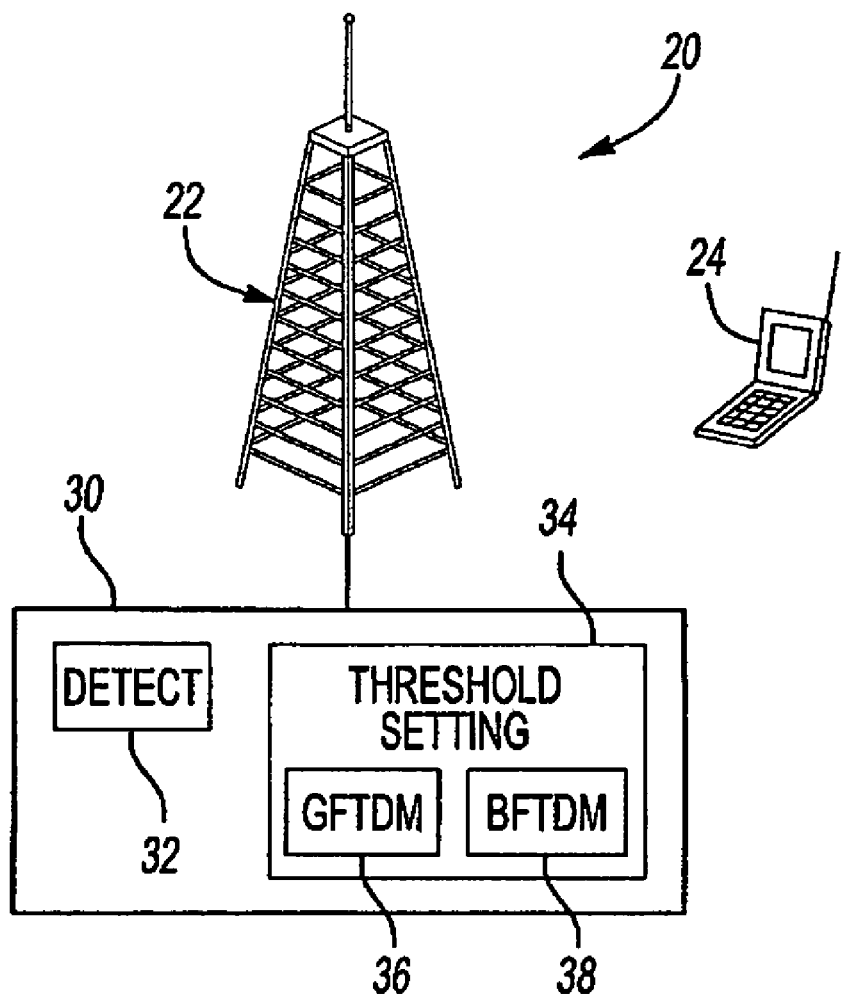
FIG. 1 schematically shows selected portions of a wireless communication system designed according to an embodiment of this invention.

This invention provides a technique for adaptively setting a threshold that is useful to distinguish DTX's from erasures. A disclosed example embodiment includes using histogram distribution information to derive a set of values that provide an indication of a threshold based upon the good frames within a sample set on the one hand and a threshold based upon the bad frames within the sample set on the other hand. The term "good frame" is used in this description to refer to frames that are processed without any discernible error. The term "bad frame" is used in this description to refer to frames associated with a checksum error, for example (e.g., erasures and DTX's). The disclosed example includes choosing the least of the good frame threshold and the bad frame threshold as the threshold for distinguishing between DTX's and erasures. One example includes considering a sample set of the most recent 50 frames to set a threshold for the next 10 frames.

There are several advantages to the disclosed example. One advantage is that the threshold is adaptively set based upon actual communication activity without being adversely impacted or skewed by the number of erasures in a sampling set of frames. Bad frames, as that phrase is used in this description, refer to DTX's and erasures. The disclosed example includes using an estimated median value of a histogram of the bad frames, which is relatively insensitive to the number of erasures within the bad frames of a sample set.

With a normalized metric or filter based approach, by contrast, a few erasures within the bad frames tends to skew the threshold too high. This occurs, in part, because a normalized approach assigns a higher value to an erasure by design. Target error rates (e.g., 5%) typically are satisfied in most communication systems and the number of erasures are relatively low compared to DTX bad frames. This is why a higher value is associated with erasures by design. The problem occurs when the higher values associated with the erasures get averaged into the final result.

The disclosed example is also insensitive to having a number of very high energy good frames. A filter based approach can be unduly influenced by a few good frames sent under very good channel conditions with high energy. The resulting high normalized DTX value cause an associated threshold to be higher than desirable (e.g., a threshold that is too high increases the possibility for falsely identifying erasures as DTX's). The disclosed example essentially facilitates setting a threshold based on the energy levels of frames that barely have enough energy to qualify as good frames (e.g., to be properly received and successfully decoded). Using such a value is a good starting point for establishing a proper threshold value.

Another advantage is the ability to control performance over a full mix of good frames and bad frames in a sample set. For example, when there are a small number of bad frames, the variance of the estimated median value of the bad frame histogram will be large. The disclosed example includes using a higher percentile value from the histogram (e.g., be more conservative in view of the small number of bad frames) to adjust for the increased variance.

Another advantage to the adaptive approach of the disclosed example is that it truly changes with changing channel conditions. Utilizing a limited sample set of recently received frames for setting a threshold that is used for a smaller set of future received frames allows for eliminating any effect from what transpired more than a short time ago (e.g., one second) when setting a new threshold. A filter based approach, on the other hand, has some memory of the distant past, which reduces the responsiveness of such threshold setting techniques.

Referring to FIG. 1, selected portions of an example wireless communication system 20 include a base station 22 that communicates with one or more mobile stations 24 using known techniques. In this example, it is possible for the mobile station 24 to periodically, intentionally not transmit any symbols or data during a frame, which results in a DTX.

The example base station 22 includes a power management module 30. One feature of the power management module 30 is a detector 32 that uses a selected, known technique (e.g., a checksum approach) for monitoring what is received at the base station 22 for purposes of determining which of the received frames are good frames and which are bad frames. The actual technique used by the detector 32 may be any one that is suitable for a particular situation.

A threshold setting module 34 adaptively provides a threshold that is useful to the detector 32 for distinguishing between a bad frame that is an erasure and one that is a DTX. The example threshold setting module 34 uses the energy levels or DTX metrics of each type of frame from a sample set of recently received frames for setting a threshold used by the detector 32 for an ensuing set of incoming frames.

For purposes of discussion, a sample set of 50 recently received frames (e.g., the frames received in the most recent second) is used to set a threshold that will be used for the next 10 to-be-received frames (e.g., for the next 200 milliseconds). This discussion focuses on an example sample set that includes 15 bad frames and 35 good frames.

Figure 2:
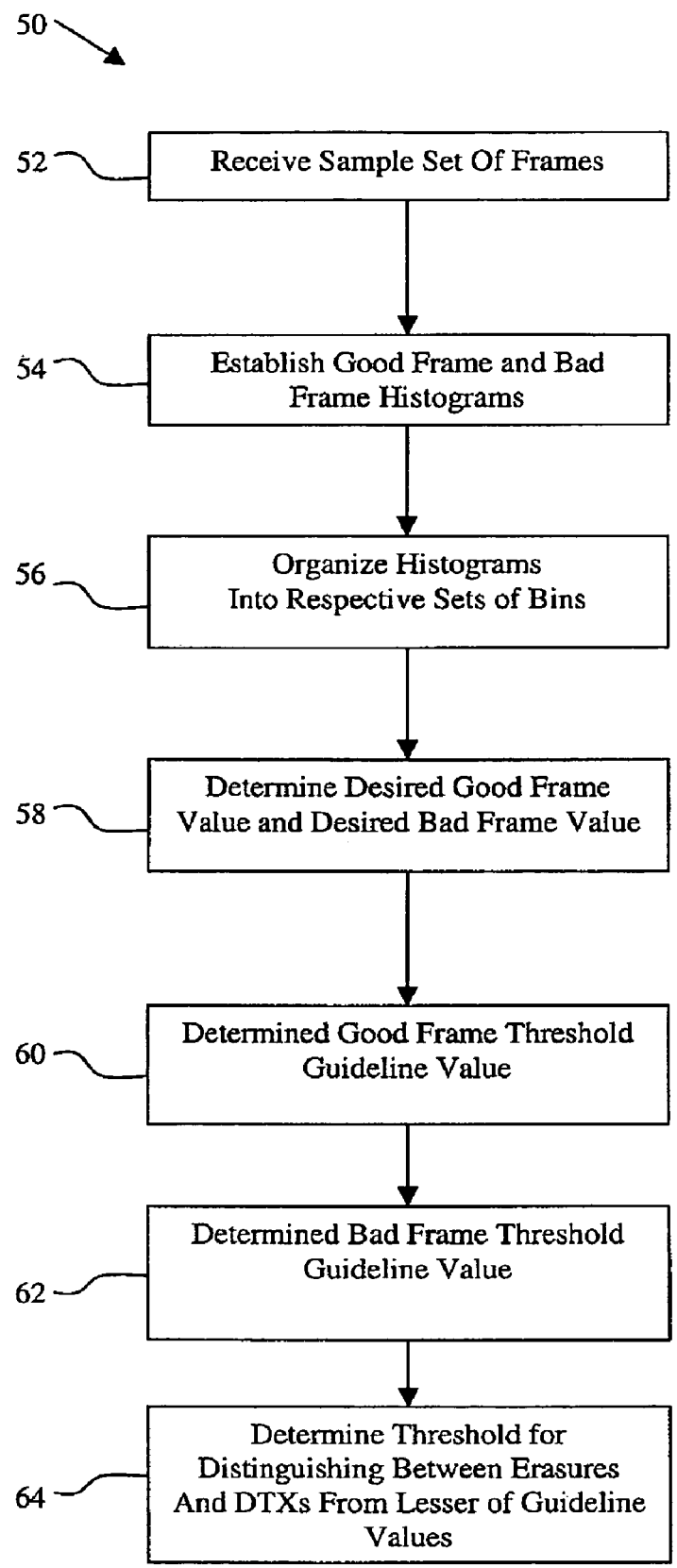
FIG. 2 is a flow chart diagram summarizing one example approach.

FIG. 2 includes a flow chart 50 that summarizes one exemplary approach taken by one example threshold setting module. In this example, a sample set of frames is received at 52. The frames are divided up into good frames and bad frames (e.g., those that resulted in a checksum error) for establishing respective histograms at 54. The histograms are then organized into bins at 56 that are arranged depending, in part, on the values of the frames. The number of good frames and the number of bad frames are then used, respectively to determine at 58 which of the frames has a value that indicates a desired value for a threshold. A good frame threshold guideline value is determined at 60 based upon the good frame desired value. A bad frame threshold guideline value is determined at 62 based upon the bad frame desired value. This example concludes at 64 where the lesser of the guideline values is selected as the threshold for distinguishing between a DTX and an erasure.

Referring again to FIG. 1, more details of one example threshold setting strategy will be described.

In the example of FIG. 1, the threshold setting module 34 includes a good frame threshold determining module (GFTDM) 36 and a bad frame threshold determining module (BFTDM) 38. Both of those modules provide a preliminary threshold (e.g., a good frame threshold and a bad frame threshold) and one of them is used as the basis for the threshold provided to the detector 32.

The schematically illustrated modules may comprise software, hardware, firmware, custom circuits, microprocessors or a combination of these. Given this description, those skilled in the art will be able to select or design appropriate modules to perform the functions of the example modules in a manner that will meet their particular needs.

Considering the bad frame threshold determining module (BFTDM) 38 first, a bad frame threshold guideline value is based on the energy values of the received bad frames within a sample set. This example includes using a circular buffer to store the last second of (up to 50) DTX metrics corresponding to bad CRC frames. The BFTDM 38 begins by finding the lowest and highest valued elements in the circular buffer and designates them LowElement and HighElement, respectively. The BFTDM 38 also determines the number of bad frames in the circular buffer (0 through 50 inclusive) and designates that number NumBadFrames. Next, the BFTDM 38 establishes a plurality of bins within which the sample set of frames are placed based upon their respective DTX metrics. In this example, the BFTDM 38 uses the LowElement and HighElement values and a number of bins to establish a BinSize, which essentially evenly divides up the same set range into equally sized bins. For discussion purposes, this example includes 32 bins and the relationship BinSize=ceiling(HighElement−LowElement)/(NumBins−1) establishes the size of each bin. The bins in one example all have the same size. In some situations, where there are no bad frames or the LowElement=HighElement, then BinSize is set to a low, nonzero number.

The BFTDM 38 then rounds BinSize up to the next highest power of 2. This allows for subsequent divides by BinSize to be implemented with bit shifts in some example implementations of the disclosed threshold setting approach. In some examples, performance may be better if BinSize is not rounded up. Those skilled in the art who have the benefit of this description will be able to select between the two alternatives to meet their particular needs.

Next, the BFTDM sets several values as follows:

LowBinQuantValue=floor(LowElement/Binsize)

LowBinValue=LowBinQuantValue*BinSize and Histogram(0:NumBins−1)=0.

Once these steps are complete, the BFTDM 38 goes through the circular buffer again to establish a bad frame histogram. One example includes doing the following for each element in the sample set.

BinNumber=floor((ElementValue−LowBinValue)/BinSize)

and

Histogram(BinNumber)+=1.

Now that the bad frame histogram has been determined, the BFTDM 38 determines a bad frame threshold guideline value based upon selected frame or bin values from the sample set. Ideally, a pure sort would be used to locate the median value of the bad frame histogram but that is not computationally feasible in many situations. This example includes using information from the bins that have been set up and an expected relationship between the bin contents and the median value of the bad frame histogram to determine the bad frame threshold guideline value.

This example includes determining a value of a high element number, a low element number and a bad frame element number. The high and low numbers are defined by the following relationships:

BadFrameElementNumberLow=BadFrameElementNumberLow*a*(NumBadFrames)

and

BadFrameElementNumberHigh=BadFrameElementNumberHigh*a*(NumBadFrames);

where $$BadFrameElementNumberLowa = [00\ 00\ 00\ 01\ 01\ 01\ 01\ 01\ 01\\
01\ 01\ 01\ 02\ 02\ 02\ 02\ 02\ 02\\
02\ 02\ 02\ 02\ 03\ 04\ 04\ 04\ 04\\
05\ 05\ 05\ 05\ 05\ 06\ 06\ 06\ 06\\
07\ 07\ 07\ 07\ 08\ 08\ 08\ 08\ 08\\
09\ 09\ 09\ 09\ 09\ 10]; \text{ and}$$

$$BadFrameElementNumberHigha = [00\ 00\ 00\ 03\ 04\ 05\ 06\ 07\ 08\\
09\ 10\ 11\ 11\ 11\ 12\ 13\ 14\ 15\\
15\ 16\ 18\ 20\ 20\ 20\ 20\ 20\ 20\\
21\ 22\ 23\ 23\ 23\ 24\ 25\ 25\ 25\\
26\ 26\ 27\ 28\ 29\ 29\ 29\ 30\ 31\\
32\ 32\ 33\ 34\ 34\ 35].$$

The above decision arrays provide an indication of which frame value from the sample set should be used for setting the low and high numbers, respectively. In the example where there are 15 bad frames in the sample set, the frame value of the frame corresponding to the $15^{th}$ entry in the BadFrameElementNumberLowa decision array (e.g., bad frame 02) is used for determining BadFrameElementNumberLow. Similarly, the value for BadFrameElementNumberHigh is based on the frame value corresponding to the $15^{th}$ entry in the BadFrameElementNumberHigha decision array. In this example, the $15^{th}$ entry corresponds to $13^{th}$ bad frame from the sample set.

If there were 20 bad frames in the sample set, the frames used for the low and high numbers would be the 2nd and $18^{th}$ frames, respectively, for example. If there were 40 bad frames, then bad frame 08 would be used to determine the low number and bad frame 29 would be used to determine the high number.

The decision arrays shown above were determined in one example by simulation. Another example includes decision arrays developed from empirical analysis of observed actual data. Those skilled in the art who have the benefit of this description will realize whether the values in the example decision arrays will work well for their particular situation or whether they may wish to develop arrays having different entries to better suit their needs.

The BFTDM 38 also determines another number as a basis for determining the bad frame threshold guideline value. In this example, that number is BadFrameElementNumber. When there are at least 10 frames in the circular buffer (e.g., the sample set contains at least 10 frames), BadFrameElementNumber is determined based on the relationship:

$$BadFrameElementNumber = BadFrameElementNumbera(NumBadFrames);$$

where $$BadFrameElementNumbera = [00\ 00\ 00\ 00\ 04\ 05\ 05\ 06\ 07\ 08\\
09\ 10\ 10\ 10\ 10\ 10\ 10\ 10\ 11\ 11\\
12\ 13\ 14\ 14\ 14\ 14\ 15\ 15\ 16\ 16\\
16\ 17\ 17\ 18\ 18\ 19\ 19\ 20\ 20\ 21\\
21\ 22\ 22\ 23\ 23\ 23\ 24\ 24\ 25\ 25\\
26].$$

In this example, there are 15 bad frames and the $15^{th}$ entry in the decision array BadFrameElementNumbera indicates that the $10^{th}$ bad frame should be used for determining the value of BadFrameElementNumber.

To accommodate start up conditions or times when there are 10 or less frames in the sample set contained in the circular buffer, one example includes using special decision arrays for determining the values of BadFrameElementNumber, BadFrameElementNumberLow and BadFrameElementNumberHigh:

$$BadFrameStartupElementNumberLowa = [0\ 0\ 0\ 1\ 1\ 1\\
1\ 2\ 2\ 2\ 2];$$

$$BadFrameStartupElementNumberHigha = [0\ 0\ 0\ 3\ 4\ 5\\
6\ 6\ 6\ 8\ 9];$$

$$BadFrameStartupElementNumbera = [0\ 0\ 0\ 3\ 3\ 3\ 4\ 4\ 4\\
4\ 5].$$

For situations, where there are no frames in the sample set, another threshold setting approach can be used.

Once the three frame numbers have been identified, the BFTDM 38 goes through the bad frame histogram to determine which bins BadFrameElementNumber, BadFrameElementNumberLow, and BadFrameElement NumberHigh are in, respectively. In this example, BadFrameElementNumber=10 and the BFTDM 38 determines which bin contains the $10^{th}$ lowest element from the sample set in the circular buffer. The appropriate identified bins are designated BadFrameBinNumber, BadFrameLowBinNumber, and BadFrameHighBinNumber in this example.

The BFTDM 38 next determines threshold adjusting factors based on a width of the bad frame histogram. A wider histogram usually indicates a higher threshold is appropriate. The adjusting factors help to ensure setting the threshold accordingly. This example includes using a linear function of the width of the bad frame histogram, called BadFrame2DtxFactor, which is determined using the following relationships:

$$BadFrameWidthQuant = BadFrameHighBinNumber - BadFrameLowBinNumber,$$

and $$BadFrame2DtxFactor = BadFrameFactorYOffset + (BadFrameWidthQuant * BadFrameFactorSlope8)/2^8;$$

where BadFrameFactorYOffset and BadFrameFactorSlope8 are constants selected based on simulation or empirical analysis of actual conditions. Example values for these constants and others used in this example are provided in Table 1 below.

It is desirable to keep BadFrame2DtxFactor from getting too high so this example includes using the relationship:

$$BadFrame2DtxFactor = \min(BadFrame2DtxFactor, MaxBadFrame2DtxFactor),$$

which keeps it below the value of MaxBadFrame2DtxFactor, which is a constant having a value as shown in Table 1 below, for example. Basically, the BFTDM 38 places a limit on the possible value of BadFrame2DtxFactor according to the preselected maximum value.

Then the BFTDM 38 determines the bad frame threshold guideline value from:

$$BadFrameThreshold = BinSize * (LowBinQuantValue + BadFrameBinNumber) + BadFrame2DtxFactor.$$

The effect of multiplying BinSize by the sum of LowBinQuantValue+BadFrameBinNumber and adding the adjusting factor to account for the width of the bad frame histogram is to convert the bin number containing the appropriate frame element into a frame energy value, which indicates a possible threshold for distinguishing between a DTX and an erasure.

If BadFrameElement=0, then the BFTDM 38 sets BadFrameThreshold to a preselected high number that essentially renders BadFrameThreshold ineffective at influencing the resulting threshold because the power control module ultimately determines the threshold in this example by determining which guideline value is the lowest and sets the threshold equal to that value.

The value of BadFrameThreshold provides one guideline value for setting the threshold used by the power control module for classifying a bad frame as a DTX or an erasure so that appropriate power control can be implemented, for example.

A good frame threshold module GFTDM 36 determines a good frame threshold guideline value. This example includes finding the lowest valued element (LowElement) in the sample set and the highest valued element (HighElement) in the sample set and determining the number of good frames (NumGoodFrames) in the sample set (e.g., the contents of the circular buffer mentioned above). The BFTDM 38 will use a similar histogram-based approach as that described above for the bad frames. BinSize is set as described above. In this example, the good frame histogram, is determined using:

BinNumber=floor((ElementValue−LowBinValue)/BinSize), and

Histogram(BinNumber)+=1 for each element in the sample set.

The GFTDM 36 determines a set of numbers used to determine the good frame threshold guideline value using some of the same techniques that are used by the BFTDM 38 for determining the bad frame threshold guideline value. Some of the techniques used for the good frames are parallel to or the same as those described above and, therefore, will not be elaborated on below to the same extent. The following discussion will emphasize how determining the good frame threshold guideline value is different from determining the bad frame threshold guideline value described above.

If there are no frames in the sample set, another threshold setting algorithm may be used. If there are 10 frames in the sample set (e.g., a start up condition), then special decision arrays are used as follows:

GoodFrameElementArrayNumber=GoodFrameStartupElementNumber$a$(NumGoodFrames)

GoodFrameArrayNumberLow=GoodFrameStartupNumberLow$a$(NumGoodFrames)

GoodFrameArrayNumberHigh=GoodFrameStartupNumberHigh$a$(NumGoodFrames)

where
GoodFrameStartupNumberLow$a$=[00 00 00 01 01 02 02 02 02 02 02];
GoodFrameStartupNumberHigh$a$=[00 00 00 03 04 05 05 05 04 04 04]; and
GoodFrameStartupElementNumber$a$=[00 00 00 03 04 04 05 05 03 04 04].

Whenever there are 10 or more frames in the circular buffer, the following relationships and decision arrays are used by the GFTDM 36:

GoodFrameElementArrayNumber=GoodFrameElementNumber$a$(NumGoodFrames)

GoodFrameArrayNumberLow=GoodFrameNumberLow$a$(NumGoodFrames)

GoodFrameArrayNumberHigh=GoodFrameNumberHigh$a$(NumGoodFrames)

and, for all cases (including start up),

GoodFrameArrayNumberMed=GoodFrameNumberMed$a$(NumGoodFrames);

where

GoodFrameElementNumber$a$ = [00 00 02 03 03 03 04 04 04 04
04 04 05 05 05 05 06 06 06 06
06 06 06 07 07 07 07 07 08 08
08 09 09 09 09 09 09 09 09 09
10 10 10 10 10 10 11 11 11 11
11];

GoodFrameNumberLow$a$ = [00 00 01 01 01 02 02 02 02 02
02 03 03 03 03 04 04 05 05 06
06 06 06 06 07 07 08 08 10 10
10 10 11 11 11 11 12 12 12 13
13 13 14 14 15 15 15 16 16 16
16];

GoodFrameNumberMed$a$ = [00 00 01 02 02 03 03 04 04 05
05 06 06 07 07 08 08 09 09 10
10 11 11 12 12 13 13 14 14 15
15 16 16 17 17 18 18 19 19 20
20 21 21 22 22 23 23 24 24 25
25]; and GoodFrameNumberHigh$a$ = [00 00 02 03 03 05 05 05 06 06
07 08 08 09 09 11 10 12 12 14
14 14 16 16 17 17 17 18 19 20
20 20 21 22 23 23 24 25 25 26
26 27 28 30 30 30 32 32 33 33].

In this example, there are 35 good frames so GoodFrameElementArrayNumber=09, GoodFrameArrayNumberLow=11, GoodFrameArrayNumberHigh=23 and GoodFrameArrayNumberMed=18. If there were 49 good frames, then GoodFrameElementArrayNumber=11, GoodFrameArrayNumberLow=16, GoodFrameArrayNumberHigh=33 and GoodFrameArrayNumberMed=25.

In the event that GoodFrameElementArrayNumber=0, that is an indication that there are hardly any good frames and it is desirable to avoid using them for setting the threshold for distinguishing between a DTX and an erasure. Therefore, this example includes setting the good frame threshold guideline value GoodFrameThreshold to a very high number, which renders it ineffective at influencing the threshold for classifying the bad frames.

Otherwise, the GFTDM 36 proceeds through the good frame histogram to determine which bin GoodFrameElementArrayNumber is in and designates that bin as GoodFrameElementBinNumber. Then the GFTDM approximates the value of the selected element from the decision array by determining:

GoodFrameElementNumber=GoodFrameElementBinNumber*BinSize+LowBinValue.

The GFTDM 36 then determines GoodFrameNumberLow, GoodFrameNumberMed, and GoodFrameNumberHigh from GoodFrameArrayNumberLow, GoodFrameArrayNumberMed, and GoodFrameArrayNumberHigh in a similar manner. In this example, Low<=Med<=High, so that these three numbers can be computed with one pass through the good frame histogram.

The GFTDM 36 then proceeds toward determining GoodFrameThreshold by using GoodFrameElement as a starting point and multiplying that by a function of the high, medium and low values determined above. Determining the function in this example includes estimating a width of the good frame histogram and normalizing that width as a percentage of the values within the histogram. Then GoodFrameThreshold is modified to keep it within reasonable limits and to account for an influence that may be caused by the number of bad frames in the sample set.

In one example, the following relationship provides an estimate of the width of the good frame histogram:

GoodFrameWidth=GoodFrameNumberHigh−GoodFrameNumberLow.

Then the GFTDM 36 normalizes that using:

NormGoodFrameWidth13=round((2^13*GoodFrameWidth)/GoodFrameMed).

The GFTDM 36 then determines a scaling factor based on the normalized histogram width using the following relationships:

Delta25=NormGoodFrameWidth13*GoodFrameSlope12,

Delta10=Delta25/2^15,

GoodFrame2*Dtx*Factor10=GoodFrame*Y*Offset10+Delta10,

GoodFrame2*Dtx*Factor10=min (GoodFrame2*Dtx*Factor10, GoodFrame*Y*Max10),

GoodFrame2*Dtx*Factor10=max (GoodFrame2*Dtx*Factor10, GoodFrame*Y*Min10).

The guideline value of GoodFrameThreshold in this example is then preliminarily determined using:

GoodFrameThreshold=round (GoodFrameElementNumber*GoodFrame2*Dtx*Factor10/2^10).

That value may be used as the guideline value provided by the GFTDM 36 for some situations. This example includes some additional modifications to account for possible undesirable effects from a high frame error rate, for example. The value of GoodFrameThreshold in this example is adjusted using the following relationships:

If (NumBadFrames>=15)&

(2^10*GoodFrameThreshold<BadFrameThreshold*922), then

GoodFrameThreshold=(3*GoodFrameThreshold+BadFrameThreshold)/4

One more adjustment, which includes using a weighted average in this example, helps to prevent the previous adjustment from making GoodFrameThreshold too high:

GoodFrameThreshold=min(GoodFrameThreshold,

GoodFrameElementNumber*922/2^10,

GoodFrameNumberMed*922/2^10).

The threshold setting module 34 then determines the value of the threshold used for distinguishing a DTX from an erasure from the guideline values for example, helps to prevent the previous adjustment from making GoodFrameThreshold and example, helps to prevent the previous adjustment from making BadFrameThreshold. In this example, the guideline value that is lower becomes the threshold used by the detector 32.

The above example includes using a number of constants. Those will vary depending on the particular application of the above technique. The code rate and the target probabilities of properly classifying bad frames will control the selection of values for the constants. Table 1 provides example constant values for a 19.2 Kbit code rate and two different target probabilities, which are designed to keep errors in classifying bad frames as erasures or DTX's less than about 0.1%.

TABLE 1

| TargetPED == 1e−3 | |
|---|---|
| MaxTholda(DataRate) = | 3452 |
| BadFrameFactorYOffseta(DataRate) = | 213 |
| MaxBadFrame2DtxFactora(DataRate) = | 800 |
| BadFrameFactorSlope8a(DataRate) = | 600 |
| GoodFrameYOffset10a(DataRate) = | 596 |
| GoodFrameYMin10a(DataRate) = | 800 |
| GoodFrameYMax10a(DataRate) = | 940 |
| GoodFrameSlope12a(DataRate) = | 10600 |
| TargetPED == 1e−2 | |
| MaxTholda(DataRate) = | 3450 |
| BadFrameFactorYOffseta(DataRate) = | 190 |
| MaxBadFrame2DtxFactora(DataRate) = | 630 |
| BadFrameFactorSlope8a(DataRate) = | 307 |
| GoodFrameYOffset10a(DataRate) = | 651 |
| GoodFrameYMin10a(DataRate) = | 600 |
| GoodFrameYMax10a(DataRate) = | 830 |
| GoodFrameSlope12a(DataRate) = | 6504 |

As will be appreciated by those skilled in the art, the disclosed example provides an adaptive approach to setting a threshold for distinguishing between DTX's and erasures that is more reliable and accurate than other techniques that are undesirably influenced by the number of erasures and number of high power good frames within a sample set. The disclosed example uses a histogram-based approach and a simulated sort of the histogram to provide guideline values that are used to determine the appropriate threshold for error detection in subsequently received frames.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of adaptively determining a threshold for distinguishing between a DTX and an erasure based upon at least one determined guideline value from a histogram of a sample set of recently received frames, comprising the steps of:

determining the histogram of the sample set by determining a good frame histogram of the good frames in the sample set and a bad frame histogram of the bad frames in the sample set;

arranging each histogram into a plurality of bins each having a bin size based on a range of the corresponding histogram and a number of the plurality of bins;

placing each one of the corresponding sample set frames into one of the bins corresponding to an energy value of each frame;

selecting a value of one of the bins as an indicator of a desired value of the good frame histogram and the bad frame histogram, respectively;

determining a good frame threshold value based on the desired value of the good frame histogram;

determining a bad frame threshold value based on the desired value of the bad frame histogram; and selecting the lower of the determined good frame threshold value or the determined bad frame threshold value as the adaptively determined threshold for distinguishing between a DTX and an erasure.

2. The method of claim 1, comprising predetermining a decision array and using a corresponding entry in the decision array for selecting the value of the one of the bins as the indicator of the desired value.

3. The method of claim 1, comprising selecting the one of the bins based on a distribution of corresponding frames from the sample set in the corresponding histogram and a predetermined selection array that identifies the one of the bins useful for providing the indicator of the desired value.

4. The method of claim 3, comprising using the selected value of the one bin associated with the good frames to determine the good frame threshold guideline;

using the selected value of the one bin associated with the bad frames to determine the bad frame threshold guideline; and selecting the lesser of the good frame threshold or the bad frame threshold as the adaptively determined threshold.

5. The method of claim 1, where the desired value corresponds to an approximation of a median value.

6. The method of claim 1, comprising selecting a first period of time for defining the sample set of recently received frames to include a first number of frames and using the determined threshold for distinguishing a DTX frame an erasure for a second, lower number of incoming frames during an ensuing second, shorter period of time.

7. The method of claim 6, wherein the first number of frames is fifty and the second number of frames is 10.

8. The method of claim 1, comprising using the adaptively determined threshold to determine whether a subsequently received bad frame is an erasure.

9. The method of claim 8, comprising implementing a power control adjustment responsive to determining that the received bad frame is an erasure.

* * * * *